United States Patent [19]

McKean et al.

[11] Patent Number: 5,702,756
[45] Date of Patent: Dec. 30, 1997

[54] PROCESS FOR MAKING A THIN FILM MAGNETIC HEAD

[75] Inventors: Dennis Richard McKean, Cupertino; Alfred Floyd Renaldo, San Jose, both of Calif.

[73] Assignee: International Business Machines Corporation, Armonk, N.Y.

[21] Appl. No.: 676,693

[22] Filed: Jul. 10, 1996

Related U.S. Application Data

[63] Continuation of Ser. No. 299,780, Sep. 1, 1994, Pat. No. 5,580,602.

[51] Int. Cl.$^6$ .................................................... B05D 5/12
[52] U.S. Cl. .......................... 427/127; 427/130; 427/132; 360/113; 29/603
[58] Field of Search .......................... 427/127, 129–131; 360/113, 119–126; 29/603

[56] References Cited

U.S. PATENT DOCUMENTS

| | | | |
|---|---|---|---|
| 4,318,148 | 3/1982 | Kaminaka et al. | 360/127 |
| 4,550,353 | 10/1985 | Hirai et al. | 360/125 |
| 4,651,248 | 3/1987 | Shiiki et al. | 360/119 |
| 4,652,954 | 3/1987 | Church | 360/120 |
| 4,685,014 | 8/1987 | Hanazono et al. | 360/126 |
| 4,875,124 | 10/1989 | Dickstein et al. | 360/126 |
| 5,159,513 | 10/1992 | Dieny et al. | 360/113 |
| 5,188,920 | 2/1993 | Moriuma et al. | 430/191 |
| 5,206,590 | 4/1993 | Dieny et al. | 324/252 |
| 5,241,440 | 8/1993 | Ashida et al. | 360/126 |
| 5,256,522 | 10/1993 | Spak et al. | 430/192 |
| 5,283,155 | 2/1994 | Uetani et al. | 430/192 |
| 5,283,374 | 2/1994 | Jeffries, III | 568/721 |

OTHER PUBLICATIONS

B. Baumbach et al., "Photolysis and Thermolysis of Positive Photoresists", Journal of chemistry, vol. 30, No. 1, no month 1990, pp. 28–29.

G. Buhr et al., "Image Reversal Resist for G–line Exposure: Chemistry and Lithoraphic Evaluation", Journal of Photopolymer Science and Technology, vol. 2, No. 3, no month 1989, pp. 417–428.

W. E. Feeley et al., "The Role of the Latent Image in a New Dual Image, Aqueous Developable, Thermally Stable Photoresist", Proc. of the 7th Intl. Technical Conference on Photopolymers, no month 1985, pp. 49–64.

J. S. Gau, "Photolithography for Integrated Thin Film Read/Write Heads", Laser Microlithography II, SPIE vol. 1088, no month 1989, pp. 504–514.

L. T. Romankiw, "Use of AZ–Type Photoresist as Insulation in Multiturn Thin Film Recording Heads", IBM Technical Disclosure Bulletin, vol. 23, No. 6, Nov. 1980, pp. 2584–2585.

M. Spak et al., "Mechanism and Lithographic Evaluation of Image Reversal in AZ(TM) 5214 Photoresist", Proc. of the 7th Intl. Technical Conference on Photopolymers, no month 1985, pp. 247–269.

*Primary Examiner*—Shrive Beck
*Assistant Examiner*—Brian K. Talbot
*Attorney, Agent, or Firm*—Robert B. Martin

[57] ABSTRACT

An improved process for making thin film magnetic heads using an insulation comprising a polymer, a crosslinking agent, and 4-sulfonate diazonaphthoquinone.

11 Claims, 2 Drawing Sheets

PROCESS FOR MAKING A THIN FILM MAGNETIC HEAD

This is a continuation of application Ser. No. 08/299,780 filed on Sep. 1, 1994, now U.S. Pat. No. 5,580,602.

TECHNICAL FIELD

The present invention relates to an improved process for making a thin film magnetic head and an improved magnetic head.

BACKGROUND OF THE INVENTION

In magnetic recording technology, it is constantly desired to improve the areal density at which information can be recorded and reliably read.

The magnetic recording head-disk assembly generally comprises a thin film disk on which data is stored, and a slider having a read and write head mounted thereon. The head generally comprises a bottom magnetic yoke layer, top magnetic yoke layer, magnetic insulating gap layer, coil layer, lower insulating layer for isolating the coil from the bottom magnetic yoke layer, and an upper insulating layer for isolating the coil from the top magnetic yoke layer. The topography of the head requires that the top magnetic yoke layer conforms over the coil structure and then converges onto the magnetic gap layer at an apex angle. The efficiency of the magnetic circuit of the film head is influenced by this apex angle.

U.S. Pat. No. 4,652,954 discloses a process for the manufacture of thin film magnetic heads. The process generally involves forming a first pole piece magnetic layer (bottom yoke layer) and then depositing a nonmagnetic gap layer on the first pole piece layer. A first polymeric photoresist insulating layer is then deposited onto the gap layer. The photoresist enables the formation of a back gap. Conductive coils are then formed on the first insulating layer, and a second polymeric photoresist insulating layer is disposed onto the coils. The head is then heated at a high temperature for a lengthy period of time to hard bake the photoresist into permanent insulating layers. During this heating step, the polymeric insulating layers flow to form gently sloping edges. Lastly, the second pole piece magnetic layer (top yoke layer) is formed on the insulating layers. The apex angle of the magnetic yoke (the angle formed by the intersection of the top yoke layer and gap layer) is defined by sloping edges of the insulating layers. In order to increase the write head efficiency, it is generally desired in the art to increase the apex angle of the magnetic yoke in thin film magnetic heads. It is also desired to achieve a hard bake of the photoresist at lower baking temperatures. It is therefore an object of the present invention to provide an improved thin film magnetic head and an improved process for making a thin film magnetic head.

Other objects and advantages will become apparent from the following disclosure and the drawing.

SUMMARY OF THE INVENTION

The present invention relates to an improved process for making a thin film magnetic head and an improved thin film magnetic head. The thin film magnetic head of the present invention generally comprises a first magnetic pole piece, a nonmagnetic gap layer disposed on the first pole piece, an insulation layer which is disposed on the gap layer and comprises indene sulfonic acid and a crosslinked polymer, a conductive coil disposed in the insulation layer, and a second magnetic pole piece disposed on the insulation layer. Thin film magnetic heads of the present invention have improved magnetic sensitivity.

The process of the present invention generally comprises the steps of: (a) patterned deposition of a first layer of magnetic material on a substrate to form a first pole piece; (b) depositing a gap-forming layer of nonmagnetic material over the first layer of magnetic material; (c) depositing a first layer of insulation material on the gap layer; (d) forming a conductive coil on the first layer of insulating material; (e) depositing a second layer of insulation material over the conductive coil, the insulation material comprising a crosslinking agent, the photoinitiator 4-sulfonate diazonaphthoquinone (4DNQ) and a crosslinkable polymer; (f) heating the insulating material to crosslink the polymer and form indene sulfonic acid from 4DNQ; and (g) depositing a second layer of magnetic material on the insulating material to form a second pole piece and complete the magnetic head. The process of the present invention enables the hard-bake crosslinking of the polymer at a lower temperature for a shorter period of time.

Magnetic heads made by the process of the present invention have larger apex angles with improved write head efficiency. The magnetic heads of the present invention can be utilized as a read/write head or, alternatively, can be integrally combined with a magnetoresistive read head to form a read/write head.

A more thorough disclosure of the present invention is presented in the detailed description which follows.

DETAILED DESCRIPTION OF THE INVENTION

Figure 1:
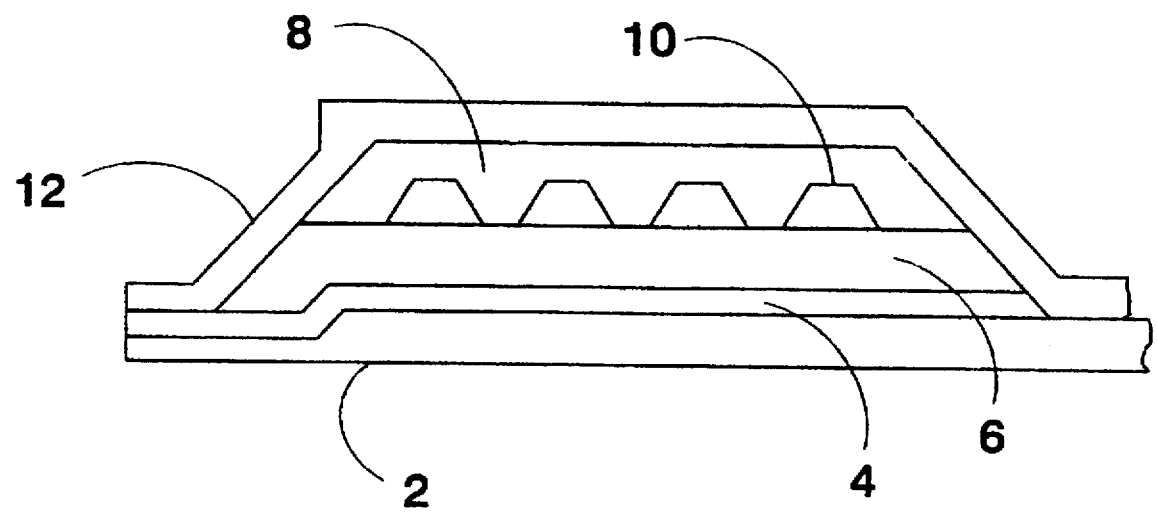
FIG. 1 is a longitudinal section view of a thin film magnetic head of the present invention.
Figure 2:
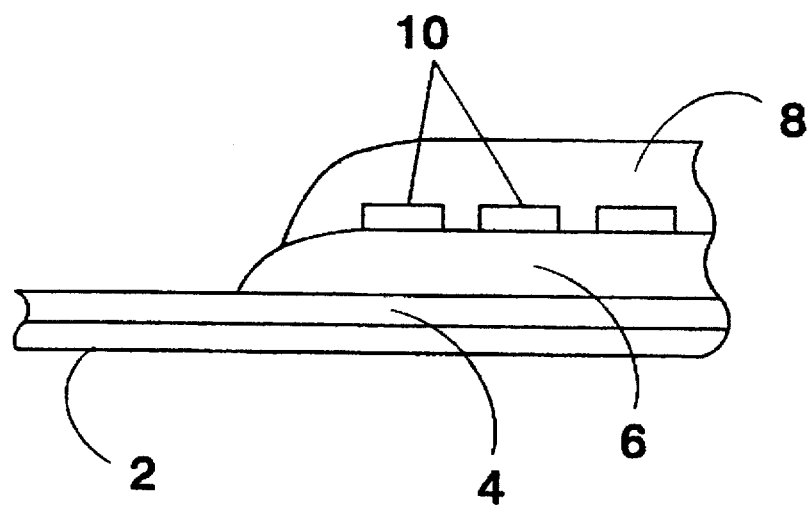
FIG. 2 is a longitudinal section view illustrating production of the thin film magnetic head according to the process of the present invention.
Figure 3:
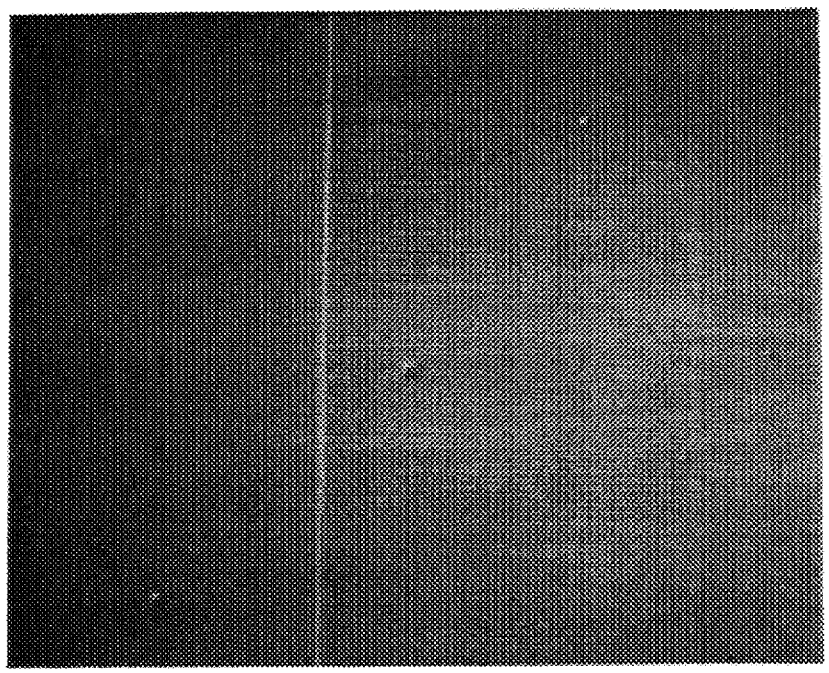
Figure 4:
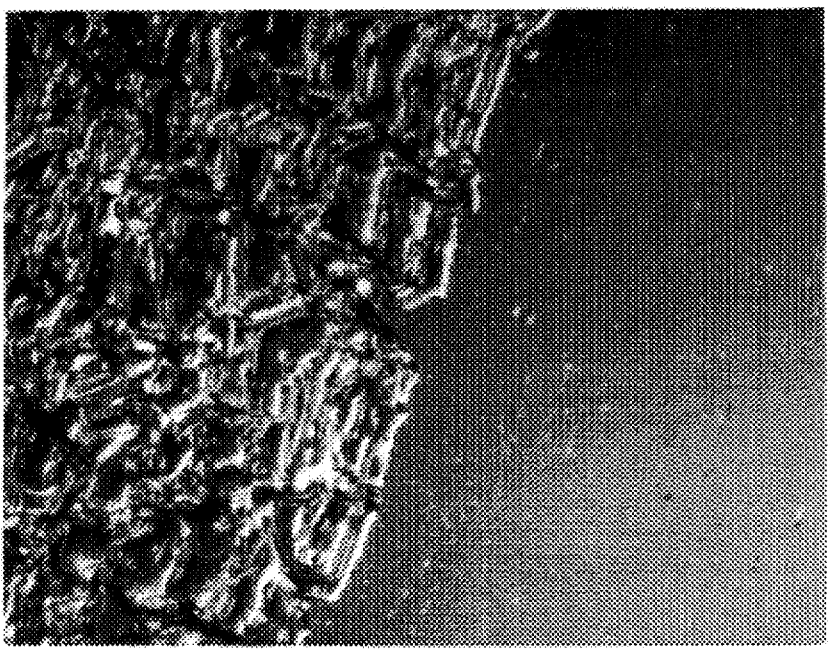

Referring to FIG. 1, the thin film magnetic head of the present invention generally comprises a first magnetic pole piece 2, a nonmagnetic gap layer 4, polymeric insulating layers 6 and 8, conductive coil 10, and second magnetic pole piece 12. Thin film magnetic heads and the process for making thin film magnetic heads are well known in the art, such as disclosed in U.S. Pat. No. 4,652,954, the disclosure of which is incorporated herein by reference. Referring to FIGS. 1 and 2, the first step of the process of the present invention involves forming the first magnetic pole piece 2. The first pole piece can be conveniently formed by first metallizing a nonmagnetic ceramic substrate (not shown) with a thin film of metal, such as NiFe, deposited by vacuum evaporation or sputtering. The pole piece is then conveniently formed by electroplating through a photoresist mask onto the metallized surface with subsequent sputter or wet etching to remove the thin metal film on the remainder of the substrate. A thin gap forming layer 4 of nonmagnetic material (e.g., $Al_2O_3$) is then deposited onto the surface of pole piece 2 to form the nonmagnetic transducing gap. The next step involves depositing a layer 6 of polymeric photoresist insulating composition onto the gap layer 4. Suitably, the thickness of the layer is from 0.5 to 10 microns. The photoresist material comprises a crosslinkable polymer, a thermally activated crosslinking agent, and the photoinitiator, 4-sulfonate diazonaphthoquinone (4DNQ). Suitable polymeric resins are phenolic resins, including polyvinylphenols and novolac resins. Preferred resins are novolacs. The uncrosslinked polymer has a molecular weight (Mn) of greater than about 10,000, preferably greater than about 12,000, and more preferably about 12,000–13,000.

The crosslinking agent is thermally activated and, at elevated temperatures, it functions to crosslink the polymeric resin into a hard-baked permanent insulating layer which does not swell upon exposure to solvent in subsequent processing steps.

It is desired that the crosslinking agent not promote crosslinking of the resin at room temperature. Suitable thermal crosslinking agents include melamine formaldehyde resins, urea-formaldehyde resins, glycolureas, epoxides, and benzyl alcohols and esters. Preferred crosslinking agents include melamine formaldehyde resins.

The photoresist material also comprises the photoinitiator, 4-sulfonate diazonaphthoquinone. A variety of suitable sulfonate ester substituents are known in the art such as phenylcumyl or naphtho substituents. However, the preferred photoinitiator is 4-(phenylcumyl sulfonate) diazonaphthoquinone. Other suitable sulfonate ester substituents are disclosed in Spak et al., U.S. Pat. No. 5,256,522, the disclosure of which is incorporated herein by reference. The phenylcumyl and naphtho ester substituents can optionally be substituted with a variety of substituents, such as lower alkyl or alkoxy (e.g., methyl or methoxy), which do not interfere with the imaging process or the crosslinking of the photoresist, and the use of these compounds in a process to make magnetic heads is contemplated as equivalent to the process claimed herein.

The insulation composition will generally comprise about 60–90 weight % of polymer, about 5–20 weight % of thermally activated crosslinking agent, and about 5–25 weight % of the photoinitiator. The crosslinking agent is suitably less than about 20 weight % of the composition, preferably less than about 15 weight %, more preferably less than about 12 weight % of the composition, as higher amounts will generally result in undesirable room temperature crosslinking with reduced shelf life of the composition. Suitable shelf life is about 3–6 months and is conveniently measured by exposure through a variable transmission step wedge mask and measurement of development times on an appropriate developer.

The components of the insulation composition are dissolved in a suitable solvent such as propylene glycol methyl ether acetate (PGMEA), ethyl ethoxypropionate or ethyl lactate. Preferably, the solid content of the mixture is about 35–50%, preferably about 45%, to obtain suitable viscosity of about 200–350 centistokes.

After the photoresist layer is disposed on the gap layer, it is then imagewise exposed to radiation. The photoinitiator acts as a dissolution inhibitor in the insulation composition. The radiation causes a Wolff rearrangement of the photoinitiator to form the corresponding base soluble indene carboxylic acid, a dissolution enhancer, thereby achieving patterned dissolution differentiation. The insulation layer is then developed in a suitable base solvent to open up the back gap closure (not shown). The back gap closure functions as a junction for the pole pieces to generate a magnetic field. The first photoresist layer is then preferably heated at an elevated temperature for a short period of time to crosslink the resin.

During the heating process, the insulation layer will experience some flow to form sloping edges. Referring to FIGS. 1 and 2, the sloping edge of the layer of insulation defines the apex angle of the head. To increase the apex angle of the head, it is desired to reduce the amount of flow of the insulation layer during the heating process. Surprisingly, the insulation composition of the present invention inhibits flow to achieve apex angles of at least 30°, preferably at least 50°, and more preferably at least 60°. The larger apex angle results in greater write head efficiency. Optionally, the insulation layer can be flood exposed to UV radiation prior to the heating step to further reduce flow during the heat step. Suitably, the insulation layer can be exposed to 350 nm radiation for a short period of time to achieve a dose of 500–1500 mJ/cm$^2$.

The insulation composition of the present invention requires lower heating temperatures and shorter heating time to achieve a hard-bake crosslinked permanent layer. The insulation composition also achieves a higher glass transition temperature (Tg). Hard baking requires the insulation layer to be resistant to solvents (e.g., less than 10% swelling, preferably less than 5% swelling, in such solvents), such as reworking solvents (e.g., N-methylpyrrolidinone (NMP)) and plating and etching solutions. Suitable heating temperatures for the process of the present invention are from 180° C. to 240° C. Surprisingly, the insulation can be hard baked at temperatures less than 200° C. (e.g., 180°–200° C.). Suitable heating times are 2–15 hours. With the insulation composition, the process of the present invention can achieve a hard-bake layer at a lower temperature and in a shorter period of time. The heating converts the 4DNQ photoinitiator into the corresponding indene sulfonic acid.

The next step of the process involves disposing conductive coils onto the first layer of insulation by art-known procedures, such as plating through a photoresist mask. Then the second layer of insulation composition is disposed onto the conductive coils. The second layer of insulation is exposed and developed to open the back gap, and then heated at an elevated temperature to hard bake crosslink the insulation generally in accordance with the procedure utilized for the first layer of insulation. Optionally, the insulation layer can be exposed to e-beam radiation to further crosslink the polymer to a permanent insulation layer. Lastly, the top yoke layer is disposed on the second insulation by evaporation, electroplating, or sputtering. The apex angle is formed by sputtering or plating the metal onto the insulation layers and the gap layer. Optionally, the magnetic head can comprise additional layers of insulation and also additional layers of coils.

The process of the present invention enables the hard baking of the photoresist insulation layer into a permanent insulation layer in a shorter time at a lower temperature, thereby saving energy costs and expediting the overall manufacturing process. Further, the process results in a thin film magnetic head having a larger apex angle with corresponding improved write head efficiency.

For read/write heads having a magnetoresistive spin valve read head contiguous with a magnetic write head, the process of the present invention importantly enables a lower temperature hard bake of the insulation (e.g., below 200° C.), thereby avoiding high-temperature metal atom diffusion migration between the metal layers of the spin valve with the resulting loss of sensitivity.

The following examples are detailed descriptions of the process of the present invention. The detailed descriptions fall within the scope of, and serve to exemplify, the more generally described methods set forth above. The examples are presented for illustrative purposes only, and are not intended as a restriction on the scope of the invention.

I. Resist Formulations

Two resist formulations were prepared, formulations A and B. Each contained three components. Each formulation comprised 77 weight % of Shipley Grade 1 novolac resin (Mw=10-12,000) and 13 weight % of crosslinking agent hexamethoxmethylmelamine. Formulation A comprised 10 weight % of the photoinitiator 1-diazo-2-oxo-4-cumylphenyl naphthalenesulfonate. Formulation B comprised 10 weight % of the photoinitiator 1-diazo-2-oxo-5-cumylphenyl naphthalenesulfonate.

II. Comparative Testing

Films of 3 micrometer thickness of each formulation were coated on silicon wafers and imaged using standard processing conditions. The wafers were exposed using a mask containing insulation pad features which are used for making functional thin film magnetic heads. Development of images was done with aqueous base solution.

Both patterned wafers were then subjected to a cure process using a thermal program which ramped the wafers to 180° C. and held at 180° C. for 2 hours before cooling.

The solvent resistance of the cured films was examined by immersion of the wafers in N-methylpyrrolidinone (NMP) for 4 minutes at room temperature. High crosslinked films have greater solvent resistance, which can be determined by measuring the amount of solvent swelling and also by observing solvent-induced cracking which occurs as a result of inadequate crosslinking. The films prepared from formulation B showed 16% swelling, whereas films prepared from formulation A showed no observable swelling. Large pads of cured film were observed by optical microscopy. The optical images show the large visual difference in solvent resistance between the two formulations. In the case of formulation A, the films show no observable effect from the NMP exposure. On the other hand, the films obtained from formulation B show extensive cracking and distortion resulting from the NMP exposure. Lastly, formulation A had a Tg of 165° C. and formulation B had a Tg of 142° C.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. A method for making a thin film magnetic head comprising the steps of:
   (a) forming a first pole piece layer of magnetic material;
   (b) depositing a gap-forming layer of nonmagnetic material over said first pole piece layer;
   (c) depositing a first layer of insulation material on the gap-forming layer;
   (d) forming a conductive coil on said first layer of insulating material;
   (e) depositing a second layer of insulation material over said conductive coil, the first and second layers of insulation material comprising a phenolic resin polymer, 4-sulfonate diazonaphthoquinone, and less than 20 weight % of a thermally activated melamine formaldehyde resin crosslinking agent;
   (f) heating the first and second layers of insulating material to crosslink the polymer; and
   (g) depositing a second pole piece layer of magnetic material to complete the magnetic head.

2. The method of claim 1 wherein the polymer is novolac.

3. The method of claim 1 wherein the first and second layers of insulating material are heated in step (R) to less than about 200° C. to crosslink the polymer.

4. The method of claim 1 wherein the first and second layers of insulation material contains less than about 15 weight % of melamine formaldehyde resin.

5. The method of claim 4 wherein said thin film magnetic head has an apex angle greater than 50 degrees.

6. A method for making a thin film magnetic write head of a magnetoresistive read/write head comprising the steps of:
   (a) forming a first pole piece layer of magnetic material;
   (b) depositing a gap-forming layer of nonmagnetic material over said first pole piece layer;
   (c) depositing a first layer of insulation material on the gap-forming layer;
   (d) forming a conductive coil on said first layer of insulating material;
   (e) depositing a second layer of insulation material over said conductive coil, the first and second layers of insulation material comprising a phenolic resin polymer, 4-sulfonate diazonaphthoquinone, and less than about 20 weight % of a thermally activated melamine formaldehyde resin crosslinking agent;
   (f) heating the first and second layers of insulating material to a temperature less than 200° C. to crosslink the polymer; and
   (g) depositing a second layer of magnetic material to complete the thin film magnetic write head.

7. The method of claim 6 wherein the polymer is novolac.

8. The method of claim 6 wherein the first and second layers of insulation material contains less than about 15 weight % of melamine formaldehyde resin.

9. A method for making a thin film magnetic head comprising the steps of:
   (a) forming a first pole piece layer of magnetic material;
   (b) depositing a gap-forming layer of nonmagnetic material over said first pole piece layer;
   (c) depositing a first layer of insulation material on the gap-forming layer;
   (d) forming a conductive coil on said first layer of insulating material;
   (e) depositing a second layer of insulation material over said conductive coil, the first and second layers of insulation material comprising a phenolic resin polymer, 4-sulfonate diazonaphthoquinone, and less than 20 weight % of a thermally activated glycol urea crosslinking agent;
   (f) heating the first and second layers of insulating material to crosslink the polymer; and
   (g) depositing a second pole piece layer of magnetic material to complete the magnetic head.

10. The method of claim 9 wherein the first and second layers of insulating material is heated in step (f) to less than about 200° C. to crosslink the polymer.

11. The method of claim 9 wherein the 4-sulfonate diazonaphthoquinone is 4-(phenylcumyl sulfonate) diazonaphthoquinone.

* * * * *